Feb. 7, 1956
F. V. JENSEN
2,733,520
CONVEYOR MECHANISM
Filed Oct. 19, 1953
7 Sheets-Sheet 1
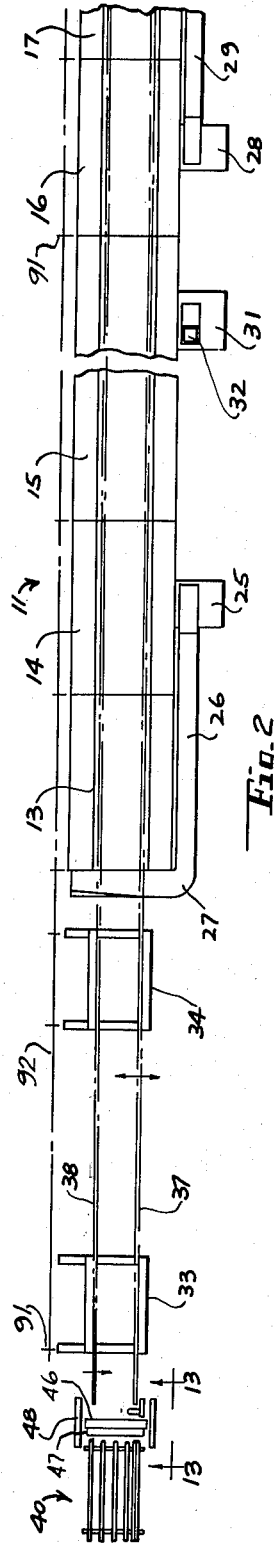
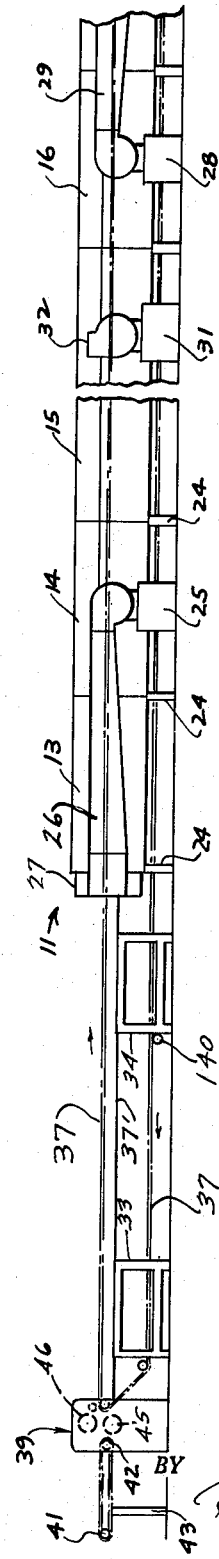
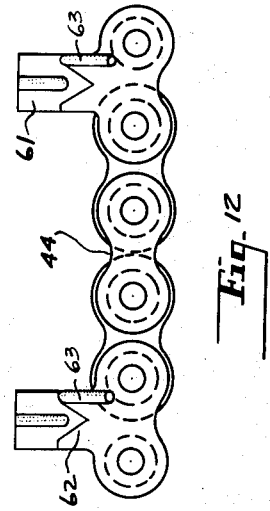
INVENTOR.
FRANK V. JENSEN.
BY
Robert A. Sloman
ATTORNEY.

Feb. 7, 1956          F. V. JENSEN          2,733,520
CONVEYOR MECHANISM
Filed Oct. 19, 1953          7 Sheets-Sheet 2
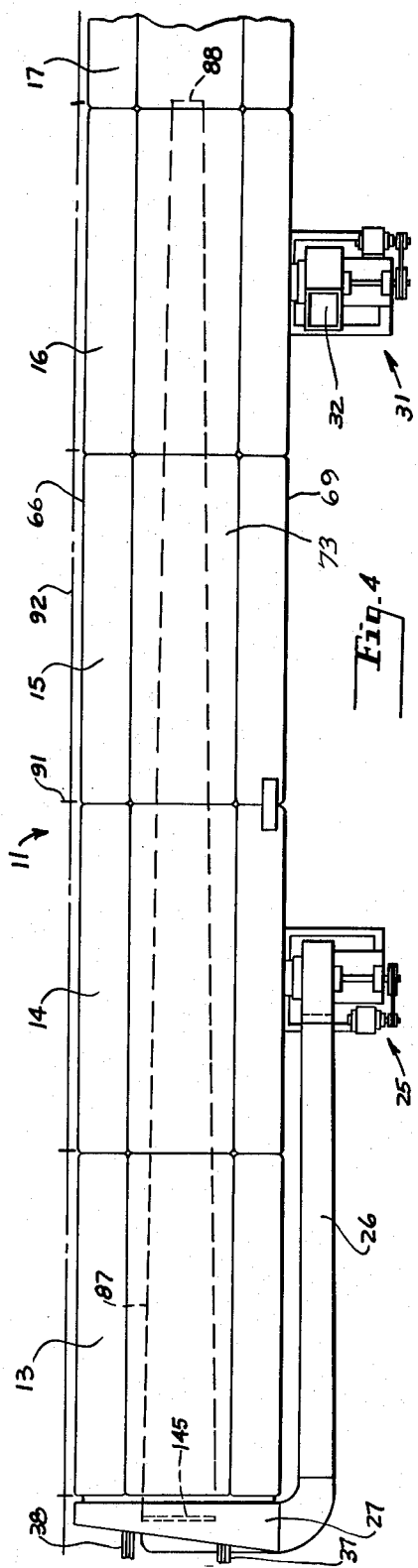
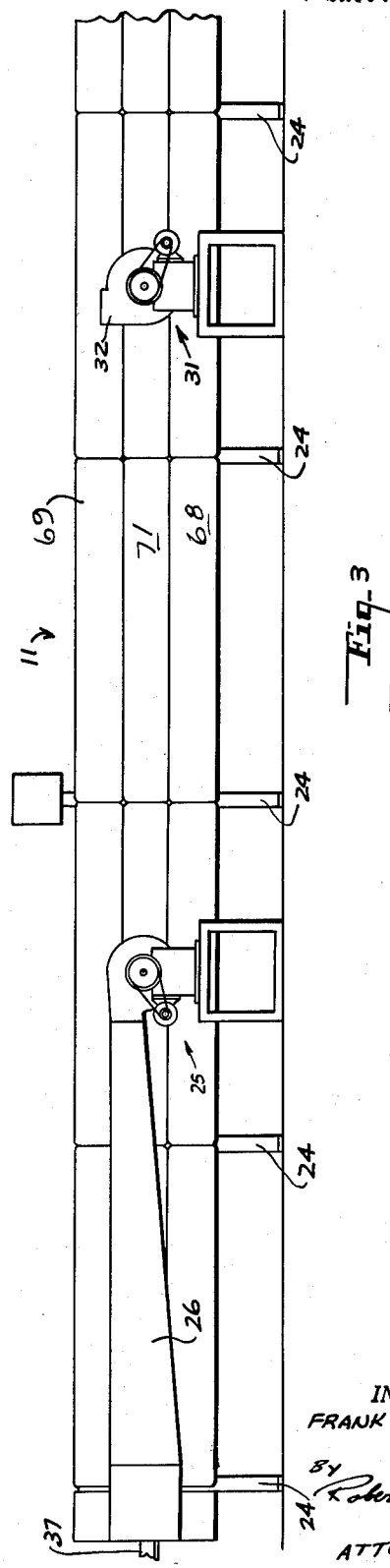
INVENTOR.
FRANK V. JENSEN.
BY Robert A. Sloma
ATTORNEY.

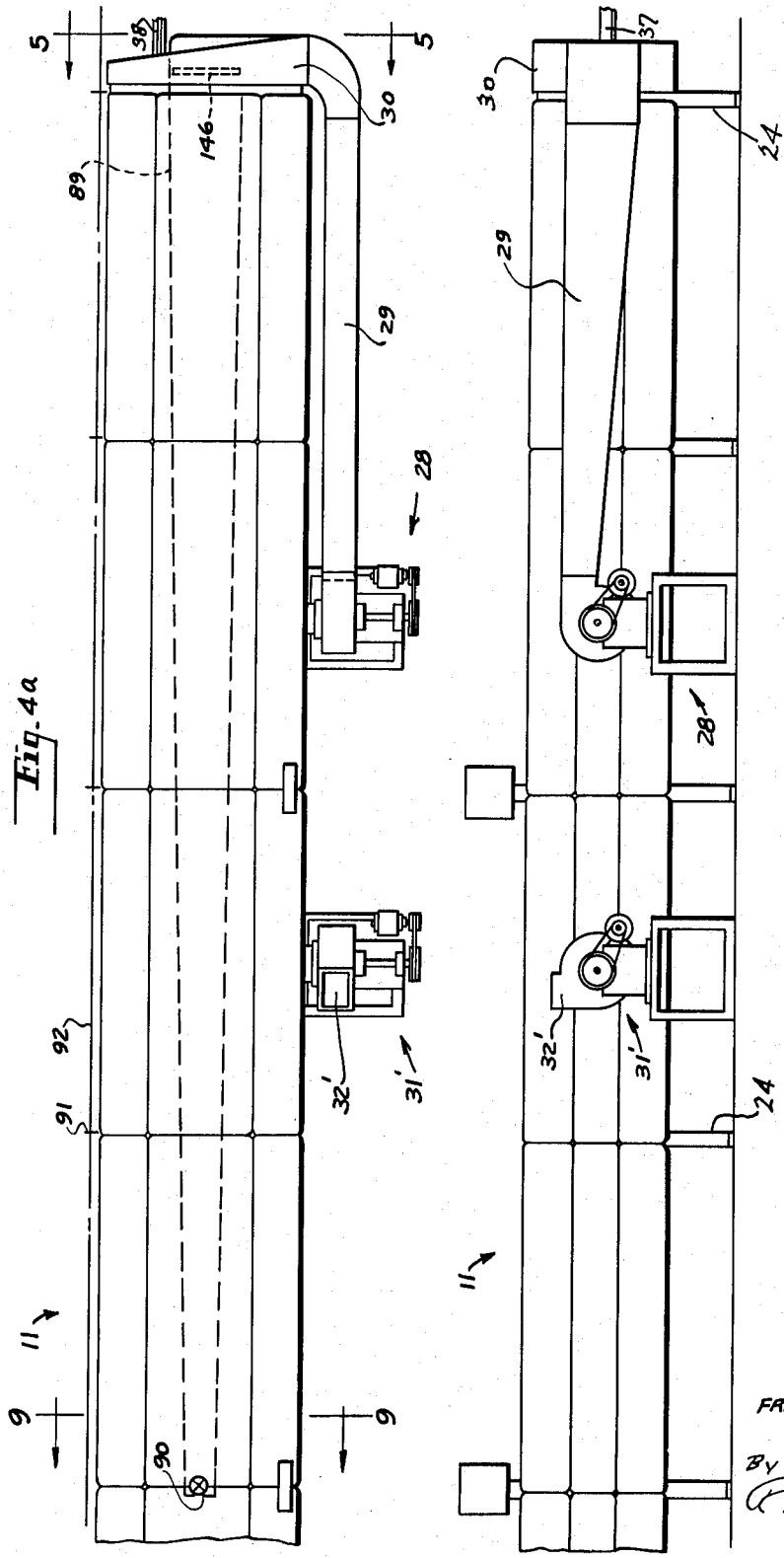

Feb. 7, 1956  F. V. JENSEN  2,733,520
CONVEYOR MECHANISM
Filed Oct. 19, 1953  7 Sheets-Sheet 4
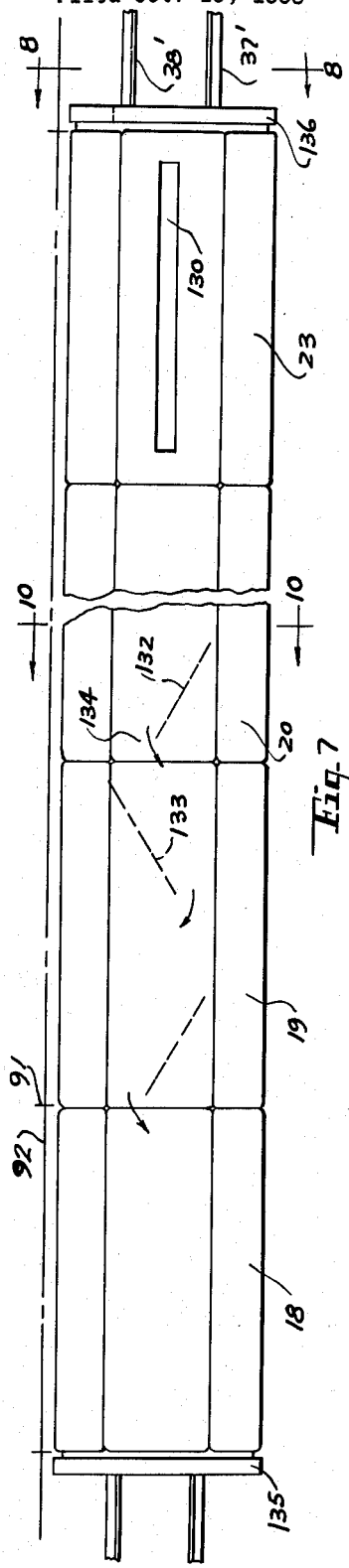
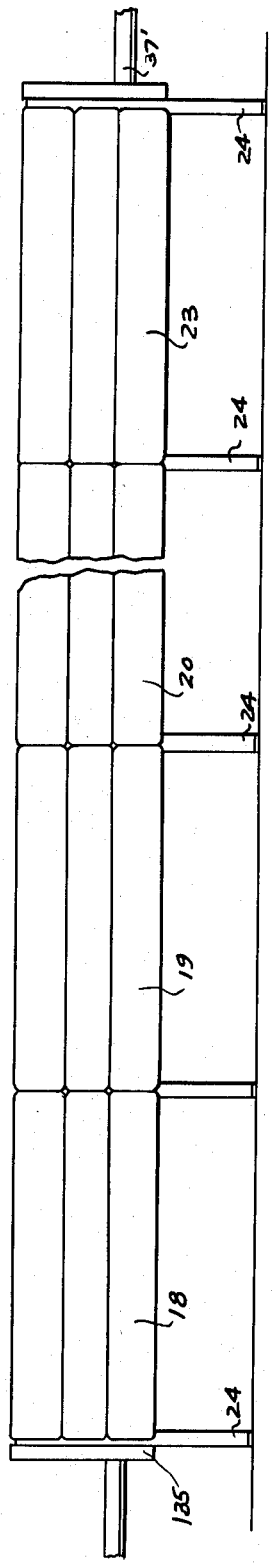
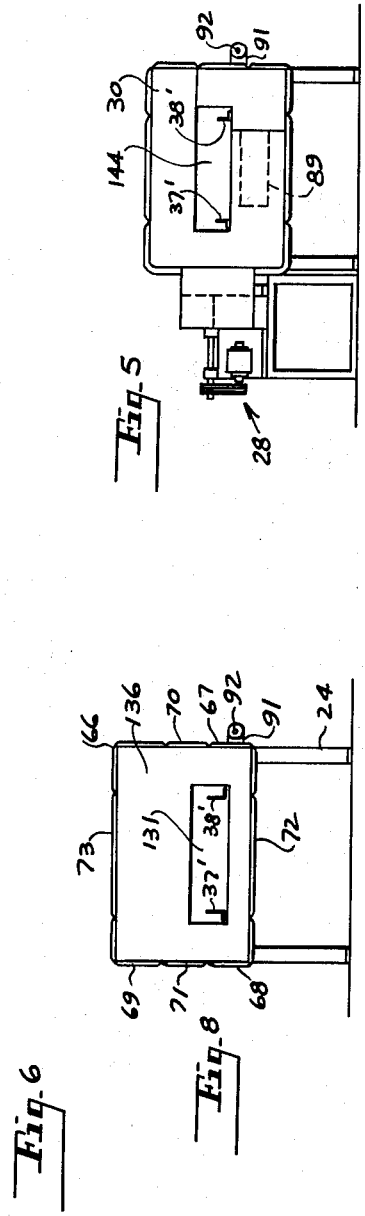
INVENTOR.
FRANK V. JENSEN.
BY
Robert A. Sloman
ATTORNEY.

Feb. 7, 1956

F. V. JENSEN 2,733,520

CONVEYOR MECHANISM

Filed Oct. 19, 1953

INVENTOR.
FRANK V. JENSEN

BY Robert G. Sloman
ATTORNEY

INVENTOR.
FRANK V. JENSEN.
BY
ATTORNEY

Feb. 7, 1956 F. V. JENSEN 2,733,520
CONVEYOR MECHANISM
Filed Oct. 19, 1953 7 Sheets-Sheet 7
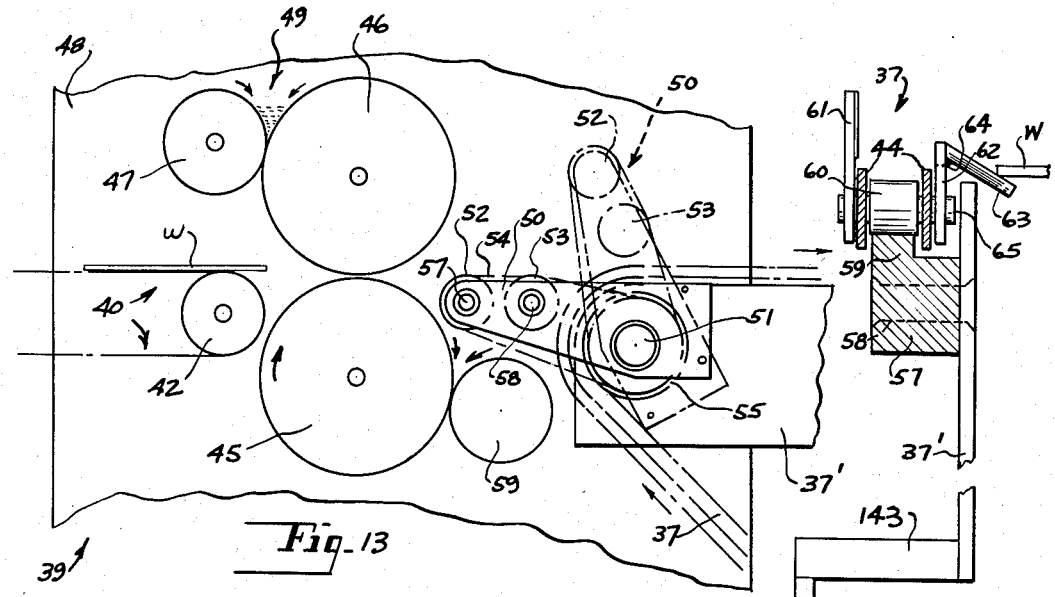
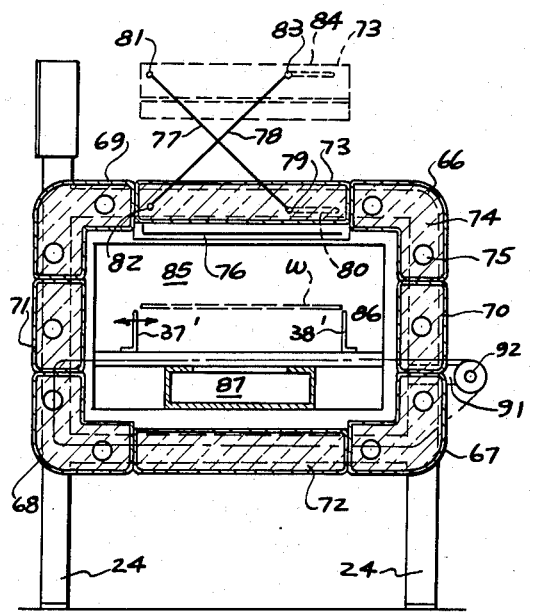
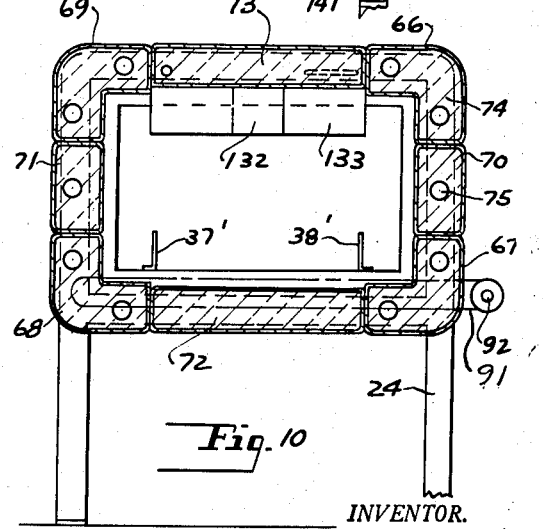
INVENTOR.
FRANK V. JENSEN.
BY
Robert A. Sloman
ATTORNEY.

United States Patent Office 2,733,520
Patented Feb. 7, 1956

2,733,520
CONVEYOR MECHANISM

Frank V. Jensen, Detroit, Mich., assignor to Jensen Specialties, Inc., Detroit, Mich., a corporation of Michigan Application October 19, 1953, Serial No. 386,975

12 Claims. (Cl. 34—66)

This invention relates to commercial ovens, and more particularly, to a drying oven and a cooling tunnel in conjunction therewith, together with the conveyor apparatus movably extending through said oven and tunnel.

It is the object of the present invention to provide a novel construction of drying oven, and wherein the oven is constructed of a plurality of longitudinally aligned segments and wherein each segment consists of a plurality of independent panel elements.

It is the further object of the present invention to provide a novel conveyor mechanism extending through the oven and cooling tunnel for transmitting therethrough painted or enameled articles, so as to have a minimum of contact therewith.

It is the further object of the present invention to provide a conveyor mechanism which is laterally adjustable within the oven for supporting workpieces of different dimension.

It is the further object of the present invention to provide a simplified mechanism for regulating the lateral adjustment of one of the conveyor elements of the conveyor mechanism whereby said conveyor element is laterally adjusted throughout the entire length of the oven and cooling tunnel in one operation.

These and other objects will be seen from the following specification and claims, in conjunction with the appended drawings, in which:

Fig. 1 is a fragmentary side elevational view of the drying oven.

Fig. 2 is a plan view of Fig. 1.

Fig. 2a is a plan view of Fig. 1a.

Fig. 3 is a fragmentary side elevational view of a portion of the drying oven on an enlarged scale.

Fig. 3a is a fragmentary side elevational view as a continuation of Fig. 3, illustrating a portion of the drying oven on an enlarged scale.

Fig. 4 is a plan view of Fig. 3.

Fig. 4a is a plan view of Fig. 3a.

Fig. 5 is an end elevational view of the drying oven taken on line 5—5 of Fig. 4a.

Fig. 6 is a side elevational view of the cooling tunnel on an increased scale.

Fig. 7 is a plan view thereof.

Fig. 8 is an end elevational view of the cooling tunnel taken on line 8—8 of Fig. 7.

Fig. 9 is a section taken on line 9—9 of Fig. 4a, illustrating the construction of the drying oven.

Fig. 10 is a section taken on line 10—10 of Fig. 7, illustrating the construction of the cooling tunnel.

Fig. 11 is a fragmentary elevational view illustrating the construction of the laterally adjustable conveyor element and its mounting.

Fig. 12 is a fragmentary side elevational view of a portion of the conveyor.

Fig. 13 is a fragmentary side elevational view of the device for applying paint to the workpiece before it is introduced into the drying oven.

It will be understood that the above drawings illustrate merely the preferred embodiment of the invention, and that other embodiments are comtemplated within the scope of the claims hereafter set forth.

Figure 2A:
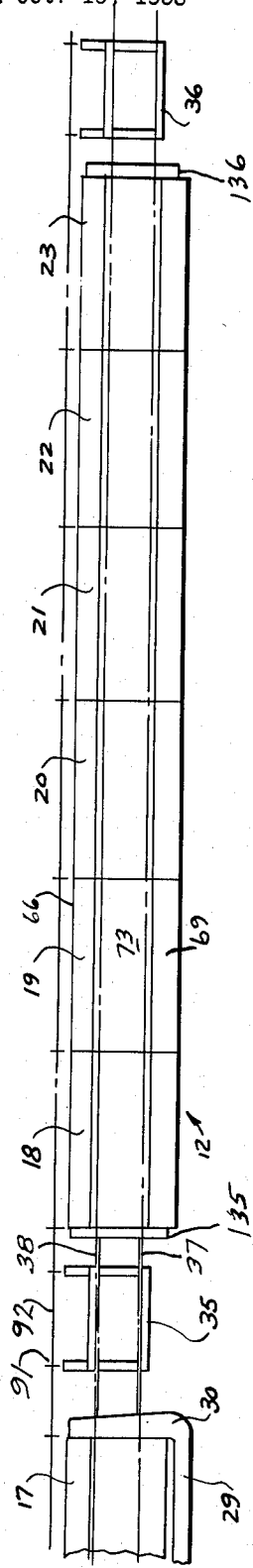
Figure 1A:
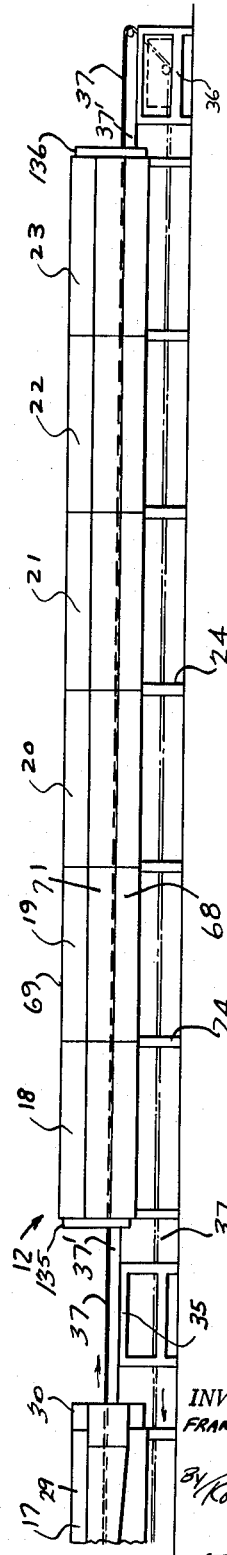
Fig. 1a is a fragmentary side elevational continuation of said drying oven and the cooling tunnel connected therewith.

Referring to the drawings, the drying oven is generally indicated at 11 in Figs. 1, 2, 3 and 4, a portion of said oven also being shown in Figs. 1a and 2a. The oven is furthermore shown on an enlarged scale in Figs. 3, 3a, 4 and 4a, and includes a longitudinally aligned series of interconnected oven elements 13, 14, 15, 16 and 17, which when assembled provide a unitary structure.

There is provided in conjunction with said oven a longitudinally aligned cooling tunnel, which includes a series of similarly formed longitudinally aligned interconnected tunnel elements 18, 19, 20, 21, 22 and 23.

Each of the oven and tunnel elements are supported at their opposite ends by the upright legs 24, which form a part of a supporting framework between which are interposed in connection with each oven or tunnel element a series of insulated panels hereafter described.

In the manner hereafter described, there are provided within each of the oven elements certain electrical heating means for maintaining a pre-determined temperature upon the interior of the drying oven for drying the articles W as they are transmitted through said oven by the conveyor mechanism which extends therethrough.

Provision is also made for the re-circulation of the heated air within the oven through air ducts 87—88 and 89—90, which extend from opposite ends of the oven and terminate towards central portions thereof. For this purpose, there are provided a pair of ducts 26 and 29, which communicate at one end with the interior drying chamber 85, Fig. 9, and which by means of a motor and blower arrangement 25 and 28 respectively, recirculate the heated air to the opposite chambered end portions 27 and 30 respectively of said oven for the passage of said heated air through the air ducts 87 and 89, which are positioned below the conveyor mechanism and which have the centrally arranged outlets 88 and 90, respectively. As the opposite ends of the drying oven are open, the recirculation of the heated air through the end portions of the oven tends to maintain the heating within the oven and at the opposite ends thereof, which are exposed to atmospheric air at room temperature. There are also provided the exhaust stacks or outlets 32 and 32' in communication with the interior of the oven together with the blower mechanism 31 and 31' connected therewith for removing exhaust vapors and fumes from the interior of the drying oven to the outside atmosphere.

There are provided in advance of the heating oven, as illustrated in Figs. 1 and 2, a pair of longitudinally spaced tables 33 and 34, upon which are supported the supporting rails of the conveyor elements 37 and 38, which extend through the hollow interior of the drying oven 11, and through the cooling tunnel shown in Figs. 1a and 2a. An additional conveyor supporting table 35 is spaced between the oven and cooling tunnel, and an outer conveyor supporting table 36 is arranged rearwardly of the cooling tunnel, whereby the conveyor mechanism is suitably supported in spaced relation to the interior of the said oven and cooling tunnel.

In advance of the table 33 is a paint applying mechanism, generally indicated at 39, whereby a coat of paint may be rolled upon opposite sides of the workpiece before presenting the same to the conveyor 37—38.

The work-feed conveyor 40 is positioned in advance of the coating device 39 and is supported at its opposite ends upon the spaced sprockets 41 and 42, said feed conveyor having for a suitable support 43, as illustrated in Fig. 1. The flat workpieces to be painted are transmitted by the feed conveyor 40 between the paint coating rollers 45 and 46, there being an elevated roller 47 in contact with roller 46 between which is provided a paint supply 49. On rotation of the paint applying rollers 45 and 46, a film of paint or enamel is applied to both sides of the workpiece W, which is then transmitted to the work transfer rollers 52 and 53, which are driven by the chain 54, which extends around the drive sprocket 55 and around corresponding sprockets at the end of the transfer roll shafts 57 and 58.

The transfer rolls are supported in spaced relation upon and between arms 50, which are pivotally mounted as at 51 to the supporting rails of the conveyor elements, such as supporting rail 37' shown in Figs. 11 and 13. This same support for the arms 50 also provides a suitable journal for the sprockets, which receive the returning end portions of the conveyor elements 37 and 38 at the forward end of the conveyor in advance of the table 33.

As illustrated in Figs. 11 and 12, each of the conveyor elements 37 and 38 include a series of links 44 with spacers 60 therebetween and with the respective links interconnected by the transverse pins 65. Mounted upon the conveyor elements in longitudinally spaced relation are the upright chain attachments 61 upon one side of the conveyor; and upon the other side are the plates 62 from which extend the downwardly and inwardly projecting rods 63 secured as at 64 and adapted to supportably receive one of the longitudinal edges of the workpiece W. This method of support of the workpiece provides a minimum contact area at the bottom corner of the workpiece, so that the paint upon the dried workpiece is not damaged or marked up by the conveyor.

The spacers 60 of the conveyor elements 37 are supported throughout the length of the supporting rail 37' by means of the plate 57, which is secured at spaced points throughout its length to rail 37' by the rivets 58, or equivalent fastener; said plates 57 having an upstanding portion 59 or flange upon which the spacers 60 move.

Though not shown in the drawings, there is an identical supporting plate 57 secured throughout the length of the rail 38 for slidably supporting the conveyor elements 38 in parallel spaced relation to conveyor element 37.

Each of the elements 13, 14, 15, 16, etc., of the oven, and each of the elements of the cooling tunnel are constructed of a series of interconnected hollow panels, which include outer plates and inner plates and contain a suitable insulating medium 74.

As shown in Fig. 9, each of the said elements have the elongated right angular spaced panels 66, 67, 68, and 69, which bound the longitudinal corners of the oven element. Interposed between said corner elements are the upright elongated side panels 70 and 71, and between said corner elements are the horizontally extending bottom and top panels 72 and 73, which thereby complete the insulated wall formation of the oven construction.

Furthermore, as shown in Fig. 10, the cooling tunnel is of the same type of panel construction including the similar panel elements 66, 67, 68, 69, 70, 71, 72 and 73, which when suitably interconnected and mounted upon the supporting frame elements or legs 24 at their opposite ends complete the cooling tunnel construction.

As illustrated in Figs. 9 and 10, there are elongated conduits 75, which extend through and are arranged in longitudinal alignment with corresponding conduits in each of the panel elements whereby suitable electrical connections may be made throughout the oven and cooling tunnel.

Depending from the interior surface of the top panel element 73 of the drying oven, are a series of electric resistance heating elements 76 for supplying the desired amount of heat to the interior of the oven.

It is contemplated that these heating elements, if desired, could be applied to the interior surface of one or more of the other panel elements. However, for the purpose of the present construction only the panel element 73 is shown, as being provided with a heating mechanism.

In order to provide access to the interior of the oven, the panels 73 in the upper portion of each of the elements 13, 14, 15, 16, and 17, are vertically adjustable out of the plane of the panels 66 and 69. For this purpose, there is provided a pair of pantagraph supports 77 and 78 at opposite ends of the panels 73 with the lower end 79 of support 77 slidably positioned within a slot 80 formed in the framework 24 of the oven, and with the lower end of support 78 pivotally secured at 82 to the framework 24.

The upper end of support 77 is pivotally joined at 81 to the panel 73, and the upper end 83 of support 78 is slidably positioned within the slot 84 formed in the opposite ends of the panels 73. By this construction, the panels 73 are supported at their opposite ends within the respective supporting frames 24, and may be manually elevated into the dotted line position shown in Fig. 9 to provide access to the heating elements 76 or to the interior space 85 of the oven.

Likewise, as shown in Fig. 10, the top panel element 73 is similarly mounted and may be elevated in the same manner as panel 73 in Fig. 9, if desired.

Upon one side of the supporting frame elements 24, which are arranged in longitudinally spaced relation and in an upright position, are the laterally projecting brackets 91 which rotatably support and journal the elongated shaft 92 which extends throughout the length of the oven and cooling tunnel, and is provided at its opposite ends with the hand cranks 102.

The supports 24 are interconnected by the cross member 94. Inwardly projecting from each of the supports 24 upon one side of the supports 24 upon one side of the oven and tunnel are the inwardly projecting arms 95, upon which the stationary conveyor supporting rail 38' is secured throughout the length of said oven and tunnel upon the interior thereof. Also interconnecting the upright portion of the supports 24 are a pair of coplanar parallel cross rods 96 and 97, bridging which and slidably mounted thereon are the brackets 98, which are adapted for lateral adjustments on said rods, and upon which brackets are supported the laterally adjustable rail 37' for the conveyor element 37.

The present invention contemplates that the conveyor element 37 is adapted for lateral adjustments upon the interior of the oven and cooling tunnel, and for this purpose the supporting rail 37' for said conveyor element, as mounted on brackets 98 may be moved laterally by means of the sprocket chains 100, which are secured at 99 to said bracket, extending around the sprocket gears 101 secured to shaft 92, around the sprocket guides 103, 104, and 105 upon the framework 24 with the end of the chain secured at 106 to the opposite side of the bracket 98. By this construction, upon rotation of shaft 92 from either end thereof, each of the brackets 98 which support the rail 37' at spaced points throughout its length will be laterally adjusted, effecting a simultaneous lateral adjustment in either direction of the conveyor element 37 movably mounted thereon.

At the rear end of the cooling tunnel and across the frame 24, is a cross plate 107 and adjacent the ends of said plate upon the frame structure 24 are a pair of pillow blocks or journals 108 and 109 secured at 110 to said framework for supporting the rotatable shaft 111, which is splined as at 112, for slidably mounting thereon the sprocket 117 which drives the laterally adjustable conveyor.

The driving sprocket 113 is secured at 114 to shaft 111, and is adapted to operatively and drivingly engage the sprocket chain, generally indicated at 38, which maintains a fixed relation within the oven and tunnel.

Figure 16:
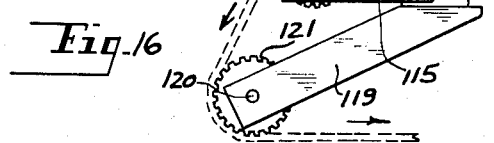
Fig. 16 is a fragmentary view taken on line 16—16 of Fig. 14.

In as much as the rail 37' is laterally adjustable, there is provided means for effecting a simultaneous lateral adjustment of the driving sprocket 117 for conveyor element 37. For this purpose, there is provided a rearwardly extending yoke 115, which projects rearwardly of rail 37' and is secured thereto at 116. The disc 118 bears against the outer wall of said yoke, so that lateral adjustment of the rail 37' will effect a corresponding lateral adjustment of the sprocket 117. A second yoke 119 projects angularly downward, as shown in Fig. 16, from the rail 37' and supportably journals at its lower end as at 120, the guide sprocket 121 supporting the return flight of conveyor element 37.

Consequently, on effecting lateral adjustments of the rail 37' under the control of the manually rotatable shaft 92, there will be a corresponding lateral adjustment of the conveyor driving sprocket 117 as well as the guide sprocket 121 around which the return flight of conveyor 37 extends.

There is also provided in vertical alignment with the stationary drive sprocket 113 for conveyor 38 a depending guide sprocket 129 for guidably receiving the return flight of conveyor 38. This sprocket 129 is supportably journaled at 128 adjacent the lower end of the depending yoke 127, which is of the same construction as yoke 119, Fig. 16, and is secured to and depends angularly downward from stationary rail 38', or the adjacent supporting framework 24.

Figure 14:
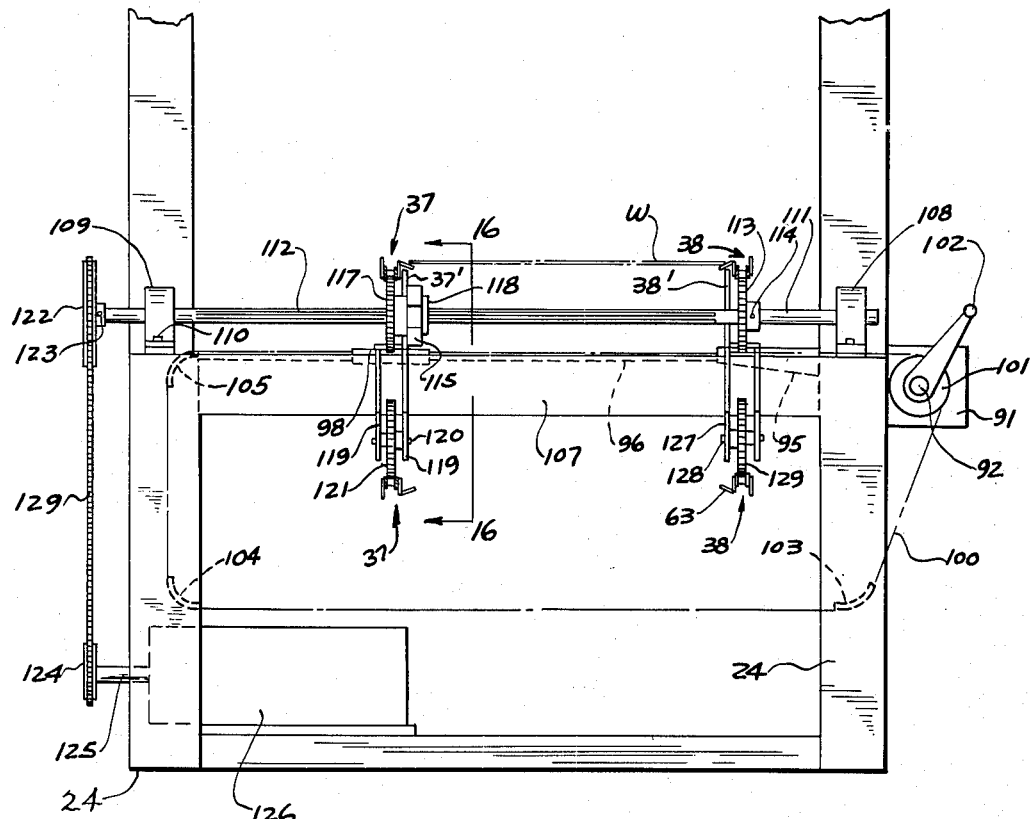
Fig. 14 is a fragmentary end elevational view of the drying oven and cooling tunnel illustrating the mounting and adjustment device for effecting lateral adjustments of one of the conveyors.
Figure 15:
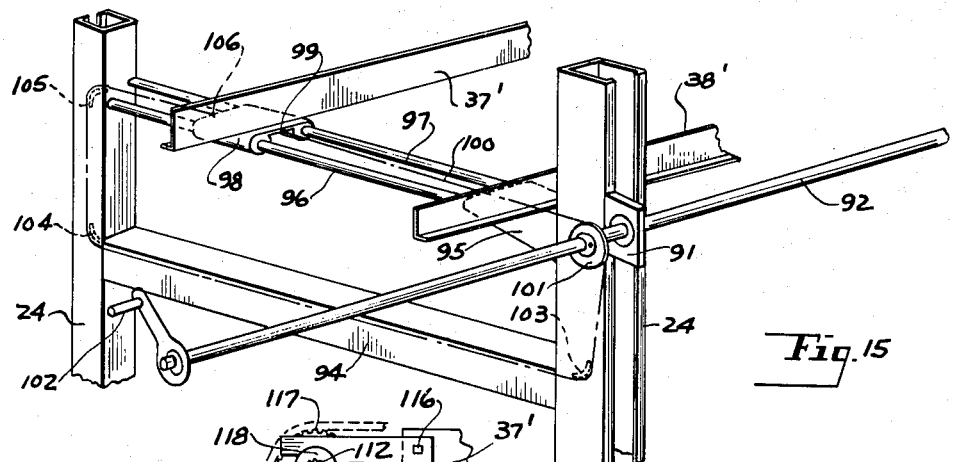
Fig. 15 is a perspective fragmentary view of the control mechanism for effecting lateral adjustments of one of the conveyors.

Motor 126 mounted upon the frame 24, Fig. 14, has a drive shaft 125 carrying drive sprocket 124. Conveyor operating shaft 111—112 has secured at one end the driven sprocket 122 secured thereto at 123 in substantial alignment with drive sprocket 124, and connected therewith by the sprocket chain 129. As shaft 111 is splined at 112, sprocket 117 is driven thereby regardless of its lateral adjustment thereon.

The return flight of the conveyors 37 and 38 is below the oven body and longitudinally spaced portions of said return flights are suspended by the idler sprockets 140, as illustrated in Fig. 11, journaled upon the shafts 141 supported by the depending bars 142 whose upper ends are joined as at 143, to portions of the conveyor supporting rails, such as rail 37', for illustration.

The drying oven has at its forward end an end plate 27, which is centrally apertured for receiving the two conveyors 37 and 38 and their supporting rails 37' and 38'. Said oven is provided at its rear end with a second closure 30, Fig. 5, which also has a central aperture 144, which is in substantial longitudinal alignment with the corresponding opening in the end wall at the forward end of the oven, and through which the conveyors 37 and 38 and their supports extend.

It is understood that the end plates 27 and 30 are chambered as above described for communication with the ducts 26 and 29, whereby the hot air is recirculated through the internal ducts 87 and 89 within the drying oven.

The cooling tunnel shown in Figs. 6 and 7 also includes the end plates 135 and 136 at its opposite ends, which generally have longitudinally aligned apertures for receiving the conveyors 37 and 38 and their supporting rails, said apertures being of such dimension as to permit lateral adjustment of the conveyor 37.

As illustrated in Fig. 8, the end plate 136 has an aperture 131, which receives the conveyor supporting rails 37' and 38'.

The cooling tunnel, which includes the elements 18, 19, 20, 21, 22 and 23, Figs. 1a, 2a, 6 and 7, has formed in its end element and within the top panel 73, a suitable opening 130 to which may be joined an exterior source of cool air to be introduced to the interior of said cooling tunnel by suitable blowers. This air is adapted to pass forwardly through the various tunnel elements taking a circuitous path therethrough through the passage openings 134 defined by the angularly arranged baffles 132 and 133, which depend from the top panels 73.

By this construction, the painted workpieces carried by the conveyors 37 and 38, after drying are cooled and at the end of the cooling tunnel may be manually or otherwise removed from said conveyors.

While the above description has defined a drying oven and cooling tunnel each consisting of a series of longitudinally aligned elements to define an oven body and an elongated cooling tunnel, and wherein the elements are made up of a series of insulate panels, it is contemplated that other oven and cooling tunnel constructions could be provided which would be adapted to receive the present workpiece conveyors and the structure whereby at least one of the conveyors is laterally adjustable for receiving different widths of workpieces.

As shown in dotted lines in Figs. 4 and 4a, both of the hollow end plates 27 and 30 in the wall thereof bounding one side of the conveyor receiving apertures therein have formed therethrough the elongated slots 145 and 146 respectively, whereby there will be a stream of hot air projected across the openings which will act as hot air gates tending to maintain a more constant oven temperature.

Having described my invention, reference should now be had to the claims which follow for determining the scope thereof.

I claim:

1. A drying oven and cooling tunnel comprising a plurality of upright longitudinally spaced frame elements, a plurality of longitudinally aligned elongated hollow segments interposed between and mounted upon adjacent pairs of some of said frame elements defining a hollow oven body, a plurality of longitudinally aligned elongated hollow segments interposed between and mounted upon other adjacent pairs of said frame elements defining a hollow cooling tunnel longitudinally spaced from said oven body, a heating element projecting from the inner surface of said hollow segments of said oven body, upright end plates at the outer ends of the outer oven segments with longitudinally aligned central apertures, upright end plates at the outer ends of the outer tunnel segments, with aligned central apertures in alignment with said first apertures, a pair of elongated rails extending longitudinally through said oven body and tunnel supported upon said frame elements, one of said rails being laterally adjustable, a pair of endless conveyors including sprocket chains respectively mounted over and supported on said rails and longitudinally and continuously movable throughout the interior length of said oven and tunnel, and longitudinally spaced opposed work support rods joined to and projected angularly inward and downward from inner portions of said conveyors for supportably receiving at spaced points the lower longitudinal edges of a workpiece whereby a painted or enameled workpiece may be continuously transmitted through a drying oven and thence directly through the cooling tunnel.

2. A drying oven comprising a plurality of upright longitudinally spaced frame elements, a plurality of longitudinally aligned elongated hollow segments interposed between and mounted upon adjacent pairs of frame elements defining a hollow oven body, each segment consisting of a plurality of elongated interconnected insulated panels arranged to form a hollow enclosure, a heating element projecting from the inner surface of at least one of said panels in each segment, upright end plates at the outer ends of the outer oven segments with centrally aligned apertures, a pair of parallel spaced horizontal conveyors extending through said apertures and through the oven body and mounted upon said frame elements, one of said conveyors being laterally adjustable so that said conveyors are adapted to receive different widths of workpieces, said conveyors including a pair of elongated rails supported upon said frame elements, one of said rails being laterally adjustable, a pair of endless sprocket chains respectively mounted on said rails and longitudinally movable thereover, each chain including a series of aligned interconnected links, and longitudinally spaced opposed work support rods joined to and projected angularly inward and downward from inner portions of opposed links of said chains for supportably receiving at spaced points the lower outer longitudinal edges of a workpiece, said rods extending transversely of said chains.

3. A drying oven comprising a plurality of upright longitudinally spaced frame elements, a plurality of longitudinally aligned elongated hollow segments interposed between and mounted upon adjacent pairs of frame elements defining a hollow oven body, upright end plates at the outer ends of the outer oven segments with centrally aligned apertures, a pair of parallel spaced horizontal conveyors extending through said apertures and through the oven body and mounted upon said frame elements, one of said conveyors being laterally adjustable so that said conveyors are adapted to receive different widths of workpieces, a plurality of horizontally disposed pairs of transverse rods interconnecting portions of said frame elements, brackets slidably mounted upon and retainingly engaging and bridging each pair of rods, one of said conveyors being positioned and secured upon said brackets, an elongated manually rotatable shaft supported and journaled upon said oven body and extending throughout the length thereof, longitudinally spaced sprockets secured to said shaft corresponding to each rail supporting bracket, and transversely arranged sprocket chains mounted upon said frame elements engaging said sprocket gears and with their respective ends joined to opposite sides of each of said brackets respectively, whereby upon manual rotation of said shaft there will be effected the simultaneous lateral adjustment of all portions of said adjustable conveyor throughout the length of said oven.

4. A drying oven comprising a plurality of upright longitudinally spaced frame elements, a plurality of longitudinally aligned elongated hollow segments interposed between and mounted upon adjacent pairs of frame elements defining a hollow oven body, upright end plates at the outer ends of the outer oven segments with centrally aligned apertures, a pair of parallel spaced horizontal conveyors extending through said apertures and through the oven body and mounted upon said frame elements, one of said conveyors being laterally adjustable so that said conveyors are adapted to receive different widths of workpieces, said conveyors including a pair of elongated rails supported upon said frame elements, one of said rails being laterally adjustable, a pair of endless sprocket chains respectively mounted on said rails and longitudinally movable thereover, a horizontally disposed power rotated splined shaft mounted upon one of said frame elements, a sprocket gear secured to said shaft and in mesh with one of said conveyors, a second sprocket gear slidably mounted upon said splined shaft and in mesh with said laterally adjustable conveyor, and a yoke secured to said adjustable rail and retainingly engaging the second sprocket gear.

5. The drying oven of claim 4, a pair of yokes joined to and depending angularly downward from said rails, and additional guide sprockets journaled within said latter yokes for receiving the return flight of said conveyors.

6. A drying oven comprising a plurality of upright longitudinally spaced frame elements, a plurality of longitudinally aligned elongated hollow segments interposed between and mounted upon adjacent pairs of frame elements defining a hollow oven body, each segment consisting of a plurality of elongated interconnected insulated panels arranged to form a hollow enclosure, a heating element projecting from the inner surface of at least one of said panels in each segment, upright end plates at the outer ends of the outer oven segments with centrally aligned apertures, a pair of parallel spaced horizontal conveyors extending through said apertures and through the oven body and mounted upon said frame elements, one of said conveyors being laterally adjustable so that said conveyors are adapted to receive different widths of workpieces, said heating element mounting panel being adapted for vertical adjustment out of the plane of the adjacent panels, and toggle linkages joined at their one ends to the opposite ends of each of said panels, and at their opposite ends joined to an adjacent frame element.

7. A drying oven comprising a plurality of upright longitudinally spaced frame elements, a plurality of longitudinally aligned elongated hollow segments interposed between and mounted upon adjacent pairs of frame elements defining a hollow oven body, upright end plates at the outer ends of the outer oven segments with centrally aligned apertures, a pair of parallel spaced horizontal conveyors extending through said apertures and through the oven body and mounted upon said frame elements, one of said conveyors being laterally adjustable so that said conveyors are adapted to receive different widths of workpieces, said end plates being hollow, open ended hot air recirculation ducts within said oven body with their outer ends in communication with said hollow end plates, and with their inner open ends in adjacent spaced relation, additional ducts upon the outside of said oven body with their one ends joined to said end plates and with their other ends joined to said oven body inwardly of its ends in communication with the interior thereof, and blowers in said latter ducts.

8. The oven of claim 7, said end wall plates having slots formed therein upon one side of the transverse rail receiving apertures formed therein, whereby hot air gates are provided at the open ends of said oven.

9. A drying oven comprising a plurality of upright longitudinally spaced frame elements, a plurality of longitudinally aligned elongated hollow segments interposed between and mounted upon adjacent pairs of frame elements defining a hollow oven body, each segment consisting of a plurality of elongated interconnected insulated panels arranged to form a hollow enclosure, a heating element projecting from the inner surface of at least one of said panels in each segment, upright end plates at the outer ends of the outer oven segments with centrally aligned apertures, a pair of parallel spaced horizontal conveyors extending through said apertures and through the oven body and mounted upon said frame elements, one of said conveyors being laterally adjustable so that said conveyors are adapted to receive different widths of workpieces, a plurality of horizontally disposed pairs of transverse rods interconnecting portions of said frame elements, brackets slidably mounted upon and retainingly engaging and bridging each pair of rods, one of said conveyors being positioned upon and secured to said brackets, an elongated manually rotatable shaft supported and journaled upon said oven body and extending throughout the length thereof, longitudinally spaced sprockets secured to said shaft corresponding to each rail supporting bracket, and transversely arranged sprocket chains mounted upon said frame elements engaging said sprocket gears and with their responsive ends joined to opposite sides of each of said brackets respectively, whereby upon manual rotation of said shaft there will be effected the simultaneous lateral adjustment of all portions of said adjustable conveyor throughout the length of said oven.

10. A conveyor comprising a plurality of upright longitudinally spaced frame elements, horizontally disposed transversely arranged rods in longitudinally spaced relation interconnecting portions of said frame elements, brackets slidably mounted upon and so formed as to retainingly engage said rods, an elongated rail immovably secured upon and bridging said frame elements, a second laterally adjustable rail in parallel spaced relation to said first rail and secured to said brackets, a pair of endless sprocket chains respectively mounted on said rails and longitudinally movable thereover, longitudinally spaced opposed work support rods joined to and projecting angularly inward and downward from opposed inner portions of each of said sprocket chains and transversely thereof for supportably receiving at spaced points the lower outer longitudinal edges of a workpiece for a minimum supporting contact therewith, said inclination of said support means tending to immovably retain said workpieces, an elongated manually rotatable shaft supported upon said frame elements parallel to said rails, and extending throughout the length thereof, longitudinally spaced sprockets secured to said shafts corresponding to and spaced from each rail supporting bracket, and transversely arranged sprocket chains guidably mounted upon said frame elements engaging said sprocket gears and respectively connected to each of said brackets, whereby manual rotation of said shaft will effect simultaneous lateral adjustment of all portions of said adjustable conveyor rail.

11. A conveyor comprising a plurality of upright longitudinally spaced frame elements, horizontally disposed transversely arranged rods in longitudinally spaced relation interconnecting portions of said frame elements, brackets slidably mounted upon and so formed as to retainingly engage said rods, an elongated rail immovably secured upon and bridging said frame elements, a second laterally adjustable rail in parallel spaced relation to said first rail and secured to said brackets, a pair of endless sprocket chains respectively mounted on said rails and longitudinally movable thereover, longitudinally spaced opposed work support rods joined to and projecting angularly inward and downward from opposed inner portions of each of said sprocket chains and transversely thereof for supportably receiving at spaced points the lower outer longitudinal edges of a workpiece for a minimum supporting contact therewith, said inclination of said support means tending to immovably retain said workpieces, a horizontally disposed power rotated splined shaft mounted upon one of said frame elements, a sprocket gear secured to said shaft and in mesh with one of said sprocket chains, a second sprocket gear slidably mounted in driving relation on said splined shaft and in mesh with said laterally adjustable sprocket chain, and a yoke secured to said adjustable rail and retainingly engaging said second sprocket gear.

12. A drying oven comprising a plurality of upright longitudinally spaced frame elements, a plurality of longitudinally aligned elongated hollow segments interposed between and mounted upon adjacent pairs of frame elements defining a hollow oven body, each segment consisting of a plurality of elongated interconnected insulated panels arranged to form a hollow enclosure, a heating element projecting from the inner surface of at least one of said panels in each segment, upright end plates at the outer ends of the outer oven segments with centrally aligned apertures, a pair of parallel spaced horizontal conveyors extending through said apertures and through the oven body and mounted upon said frame elements, one of said conveyors being laterally adjustable so that said conveyors are adapted to receive different widths of workpieces, a plurality of horizontally disposed pairs of transverse rods interconnecting portions of said frame elements, brackets slidably mounted upon and retainingly engaging and bridging each pair of rods, one of said conveyors being positioned upon and secured to said brackets, and a plurality of manually operable sprocket chains mounted upon said frame elements joined to said brackets and movable in a direction at right angles to the direction of movement of said conveyors for effecting simultaneous lateral movements of said brackets.

References Cited in the file of this patent
UNITED STATES PATENTS

| | | |
|---|---|---|
| 705,778 | McCabe | July 29, 1902 |
| 1,198,377 | Allsop et al. | Sept. 12, 1916 |
| 1,258,989 | Craig | Mar. 12, 1918 |
| 1,601,971 | Knapp | Oct. 5, 1926 |
| 2,559,713 | Dunski et al. | July 10, 1951 |